US011658357B2

(12) United States Patent
Bourgeais et al.

(10) Patent No.: US 11,658,357 B2
(45) Date of Patent: May 23, 2023

(54) DEVICE FOR COOLING BATTERIES AND ASSOCIATED PRODUCTION METHOD

(71) Applicant: Valeo Systemes Thermiques, Le Mesnil Saint Denis (FR)

(72) Inventors: Hervé Bourgeais, La Suze sur Sarthe (FR); Philippe Lemercier, La Suze sur Sarthe (FR); Frédéric Tison, La Suze sur Sarthe (FR); Céline Gohard, La Suze sur Sarthe (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 387 days.

(21) Appl. No.: 16/320,281

(22) PCT Filed: Jul. 25, 2017

(86) PCT No.: PCT/FR2017/052066
§ 371 (c)(1),
(2) Date: Jan. 24, 2019

(87) PCT Pub. No.: WO2018/020140
PCT Pub. Date: Feb. 1, 2018

(65) Prior Publication Data
US 2020/0119413 A1    Apr. 16, 2020

(30) Foreign Application Priority Data

Jul. 27, 2016 (FR) ........................ 1657236

(51) Int. Cl.
*H01M 10/613* (2014.01)
*H01M 10/625* (2014.01)
(Continued)

(52) U.S. Cl.
CPC ....... *H01M 10/613* (2015.04); *H01M 10/625* (2015.04); *H01M 10/6557* (2015.04);
(Continued)

(58) Field of Classification Search
CPC ............ H01M 10/613; H01M 10/625; H01M 10/6557; H01M 10/6567; H01M 2220/20; B60Y 2200/92
See application file for complete search history.

(56) References Cited

U.S. PATENT DOCUMENTS

2010/0015512 A1* 1/2010 Inoue ................ H01M 10/6555
429/99
2015/0207187 A1 7/2015 Beltz et al.
(Continued)

FOREIGN PATENT DOCUMENTS

CN 102575915 A 7/2012
DE 102008059972 A1 * 6/2010 .......... H01M 10/613
(Continued)

OTHER PUBLICATIONS

Busson Francois; Ibrahimi Mohamed; Moreau Sylvain; Prevost Jean-Christophe, WO2012062712A1 Heat Exchanger for a Device for Storing Electrical Energy (Description), 2012, Espacenet Patent Translate (Year: 2012).*
(Continued)

*Primary Examiner* — Cynthia H Kelly
*Assistant Examiner* — Jenna Shulman
(74) *Attorney, Agent, or Firm* — Osha Bergman Watanabe & Burton LLP (57) ABSTRACT

A cooler for at least one electrical energy storage element, the cooler comprising at least one heat-transfer liquid circulation duct, the ends of which penetrate into manifolds. Each of the manifolds comprises a collector having at least one opening for introduction and passage of at least one duct, and a cover covering the collector in such a way as to define a volume, into which the at least one duct opens, for circulation of the heat-transfer liquid. The at least one duct and the cover are mechanically assembled with the collector. A manifold further comprises at least one seal disposed (Continued)

between the collector and the at least one duct, and also between the collector and the cover.

19 Claims, 10 Drawing Sheets

(51) Int. Cl.
*H01M 10/6557* (2014.01)
*H01M 10/6567* (2014.01)

(52) U.S. Cl.
CPC ..... *H01M 10/6567* (2015.04); *B60Y 2200/92* (2013.01); *H01M 2220/20* (2013.01)

(56) References Cited

U.S. PATENT DOCUMENTS

2017/0122679 A1* 5/2017 Kenney ............... F28F 3/08
2019/0120563 A1* 4/2019 Nguyen ............ F28D 9/0056

FOREIGN PATENT DOCUMENTS

| FR | 2951259 A1 | 4/2011 | |
| JP | 2016-35378 A | 3/2016 | |
| WO | WO-2011042491 A * | 4/2011 | ............ F28F 9/0226 |
| WO | 2012062712 A1 | 5/2012 | |

OTHER PUBLICATIONS

International Search Report Issued in Corresponding PCT Application No. PCT/FR2017/052066, dated Sep. 7, 2017 (12 Pages with English Translation of International Search Report).
The Notification of Reasons for Rejection issued in corresponding Japanese Application No. 2018-545347, dated Sep. 29, 2020 (8 pages).
The Second Office Action issued in corresponding Chinese Application No. 201780022866.4, dated Aug. 13, 2021 (15 pages).

* cited by examiner

DEVICE FOR COOLING BATTERIES AND ASSOCIATED PRODUCTION METHOD

TECHNICAL FIELD OF THE INVENTION

The invention lies in the field of devices for cooling batteries, and more particularly batteries of an electric and/or hybrid drive vehicle.

PRIOR ART

Electric and/or hybrid drive vehicles are supplied with electrical energy by one or more batteries.

A problem that arises is that, when they are operating, the batteries become heated and thus there is a risk of them being damaged.

It is therefore necessary to use battery coolers in order to maintain the same at an acceptable temperature.

Such coolers comprise a bundle of tubes which interconnect at least two manifolds, into which corresponding ends of the tubes are connected in a fixed and fluid-tight manner.

A cooling fluid can then circulate through the tubes and the manifolds in order to exchange heat with the batteries.

Each of the manifolds, into which the tubes of the bundle open, includes a collector plate including openings for the tubes.

The tubes are fastened to this plate, for example by brazing, at the level of these orifices.

This plate, generally termed a "collector", is capped by a cover or "fluid box" so that the collector and the fluid box define a common volume into which the corresponding ends of the tube open, and through which the fluid enters and leaves when necessary.

The cover is provided with connections to fluid admission and collection ducts.

The interior volume of the cover is moreover subdivided into a plurality of separate sub-volumes enabling interconnection of certain groups of tubes of the bundle. This defines a predetermined configuration of fluid circulation in the cooler, involving a plurality of return journeys of fluid in the bundle of tubes.

One of the assembly techniques routinely used for this purpose is brazing, where the assembled elements of the cooler enter a brazing furnace. This permits a filler metal both to fasten together the various elements (collectors, covers, tube bundle, etc.) and to seal them.

However, it has been found that brazing the elements of the cooler tends to degrade the mechanical strength of the tubes, their pressure resistance and their resistance to internal and external corrosion.

This degraded mechanical strength can lead to deformation of the tubes when a fluid under pressure is passed through the tubes.

Moreover, when the tubes have a circular section, defects in the straightness of the generatrices of the cylindrical tube have been observed after brazing.

Similarly, if the tubes have a planar surface oriented toward the batteries (which is the case with tubes having an oblong section, for example), whereby there is a wide heat exchange surface, defects in the flatness of this plane surface have been observed.

Because of these defects of straightness or flatness in the tubes caused by brazing, heat transfer between the batteries and the cooler will not be homogeneous, thus the cooler will not provide optimum regulation of the temperature of the batteries.

To prevent these defects during brazing, an increase in the number of supports of the brazing chassis, as positioned under the tube to be brazed, has been proposed.

However, that solution presents the disadvantage of increasing the costs of the chassis and, as a result, the production costs.

SUMMARY OF THE INVENTION

An object of the invention is to improve the mechanical strength of the tubes of a cooler for batteries and consequently to optimize the cooling thereof.

To this end, the invention involves a cooler for at least one electrical energy storage element, the cooler comprising at least one heat-transfer liquid circulation duct, the ends of which penetrate into a manifold, each of said manifolds comprising a collector having at least one opening for said at least one duct, and a cover which covers/caps said collector in such a way as to define a volume for circulation of the heat-transfer liquid into which said at least one duct opens.

According to the invention, said at least one duct and said cover are mechanically assembled with said collector, said manifold further comprising at least one seal disposed between said collector and said at least one duct, and also between said collector and said cover.

Thus the invention proposes a cooler in which all of the elements of the cooler are mechanically fastened together in a fluid-tight manner.

The mechanical connection and the seal between each collector and the ducts of the cooler are obtained via compression of a seal between these two components.

The same seal, or another seal, also provides a seal between the cover and the corresponding collector. Thus, this prevents, or at least minimizes, the risk of cooling liquid leaking.

Owing to this mechanical assembly, the mechanical strength of the tubes is not degraded (in contrast to the case of assembly by brazing), and any tube flatness defects are limited.

This greatly enhances the performance of the cooler.

According to one particular aspect of the invention, said at least one duct is a tight fit in a through-hole of said seal through which it passes, so that the seal is compressed between the interior wall of said at least one opening of the collector and the exterior wall of said duct.

According to one particular aspect of the invention, the through-hole extends in a nipple of the seal disposed in the at least one opening of said collector.

According to one particular aspect of the invention, the nipple has on its exterior surface a peripheral lip to retain the seal on the collector.

According to one particular aspect of the invention, the lateral edge of the seal is sandwiched between a peripheral groove formed in the collector and the cover.

According to one particular aspect of the invention, said at least one duct comprises a plurality of heat-transfer liquid circulation channels.

According to one particular aspect of the invention, said at least one duct comprises an end flare to form a retaining relief in one direction of said at least one duct relative to the collector.

According to one particular aspect of the invention, a single end flare is disposed at one of the ends of each of said at least one duct.

According to one particular aspect of the invention, the end flare has a height between 1 and 10 mm inclusive in the longitudinal direction of said at least one duct.

According to one particular aspect of the invention, the width of the end flare is greater than a width of said at least one opening of said at least one duct.

According to one particular aspect of the invention, the end flare is produced inside a channel.

According to one particular aspect of the invention, the end flare is produced without deforming the reinforcing legs forming the lateral partition walls of said channel.

According to one particular aspect of the invention, the cooler comprises at least one duct abutment to retain said at least one duct in the other direction relative to the collector.

According to one particular aspect of the invention, said at least one abutment is fastened to said cover.

The invention also involves a method of assembling a cooler for at least one electrical energy storage element, the cooler comprising at least one heat-transfer liquid circulation duct, the ends of which penetrate into a manifold, characterized in that it comprises the following steps:

- at least one seal is positioned on a collector having at least one opening for a heat-transfer liquid circulation duct and a peripheral groove so that a nipple of the seal is disposed in an opening of said collector and the lateral edge of the seal is placed in the peripheral groove of said collector,
- at least one heat-transfer liquid circulation duct is force-fitted into a through-hole of the nipple so that one end of said at least one duct passes through the seal and the collector,
- the end of said at least one duct is flared so as to form a relief for retaining said duct in one direction relative to the collector,
- a cover is mechanically assembled onto the collector, so as to form a first manifold into which said at least one duct opens, the cover being positioned beforehand in the peripheral groove of said collector in contact with the lateral edge of the seal,
- the preceding steps are repeated to fasten said at least one duct to the second manifold of said cooler.

The method of producing a mechanically assembled cooler of the above kind therefore does not require brazing, that is to say a filler material, for the assembly of the elements with one another.

This method also has the advantage of not necessitating a costly and complex installation.

Thus a method of this kind does not include a complex heating step in a neutral and confined atmosphere.

According to one particular aspect of the invention, said at least one duct is fastened simultaneously to the first and second manifolds of said cooler.

LIST OF FIGURES

Other features and advantages of the invention will become more clearly apparent on reading the following description of one embodiment, given by way of illustrative and nonlimiting example only, and from the appended drawings, in which.

DETAILED DESCRIPTION OF THE INVENTION

Figure 1:
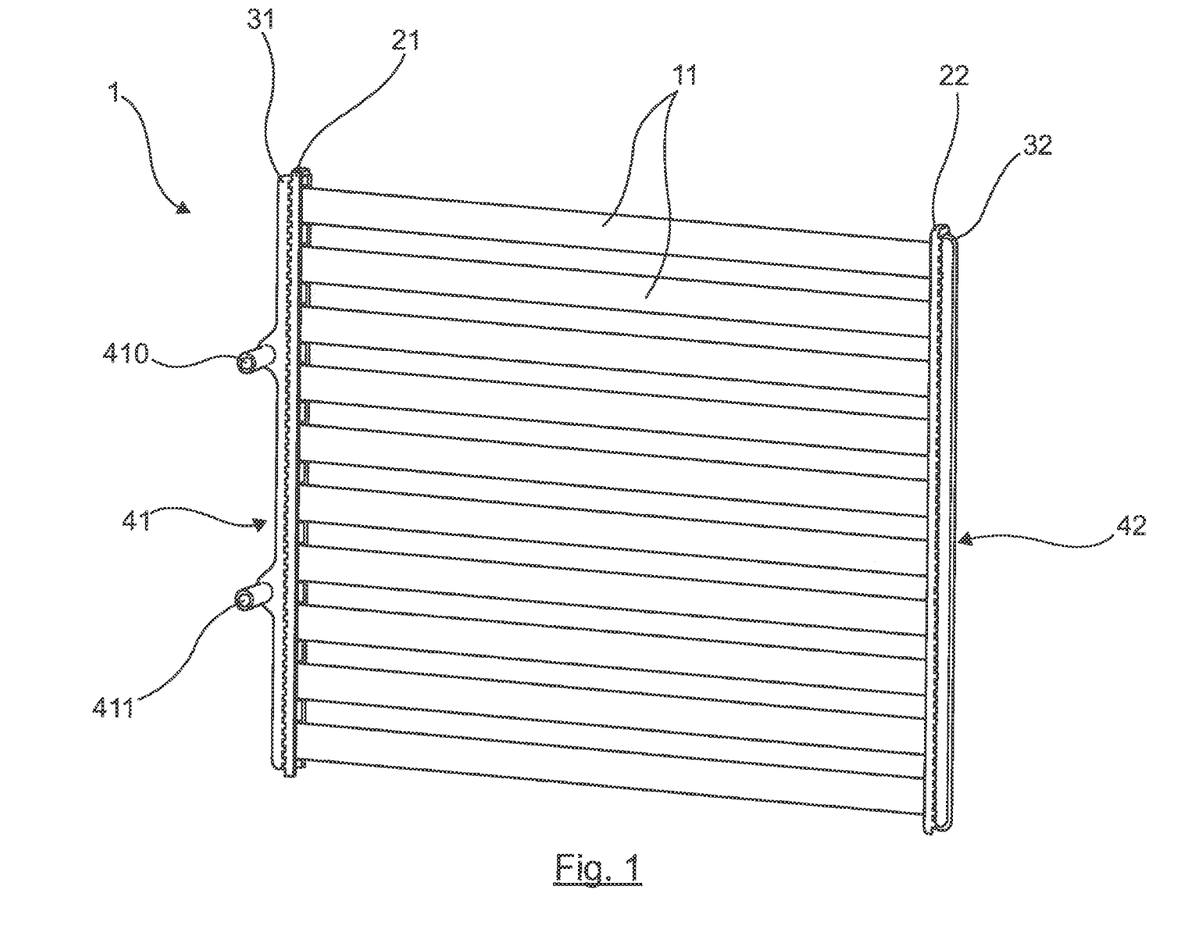
FIG. 1 is a perspective view of a cooler according to one embodiment of the invention.

FIG. 1 is a perspective view of a cooler 1 according to one embodiment of the invention.

The embodiment is intended to equip a motor vehicle of hybrid or electric type to cool one or more batteries forming an energy source for driving the motor vehicle.

The cooler 1 comprises a bundle of rectilinear tubes, or ducts, 11 of the same length placed parallel to one another and aligned so as to form a single row in which a cooling liquid, such as glycolated water, is intended to circulate.

In this embodiment, the tubes 11 have a cross section of substantially oblong shape.

Figure 9A:
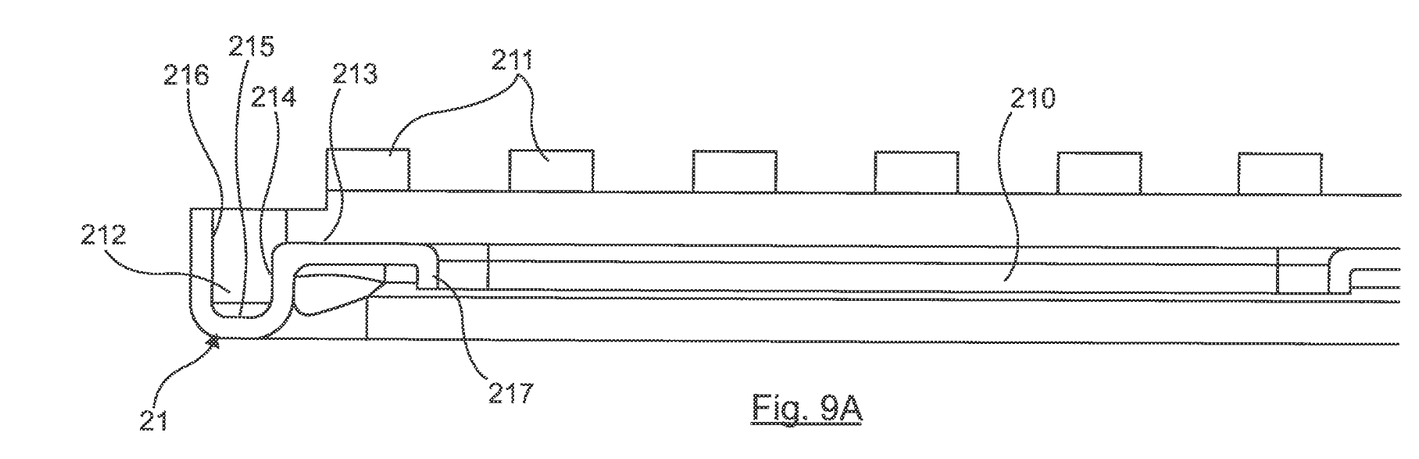
FIGS. 9A to 9E show the assembly of one end of a tube onto a manifold employed in a cooler according to the invention.
Figure 9B:
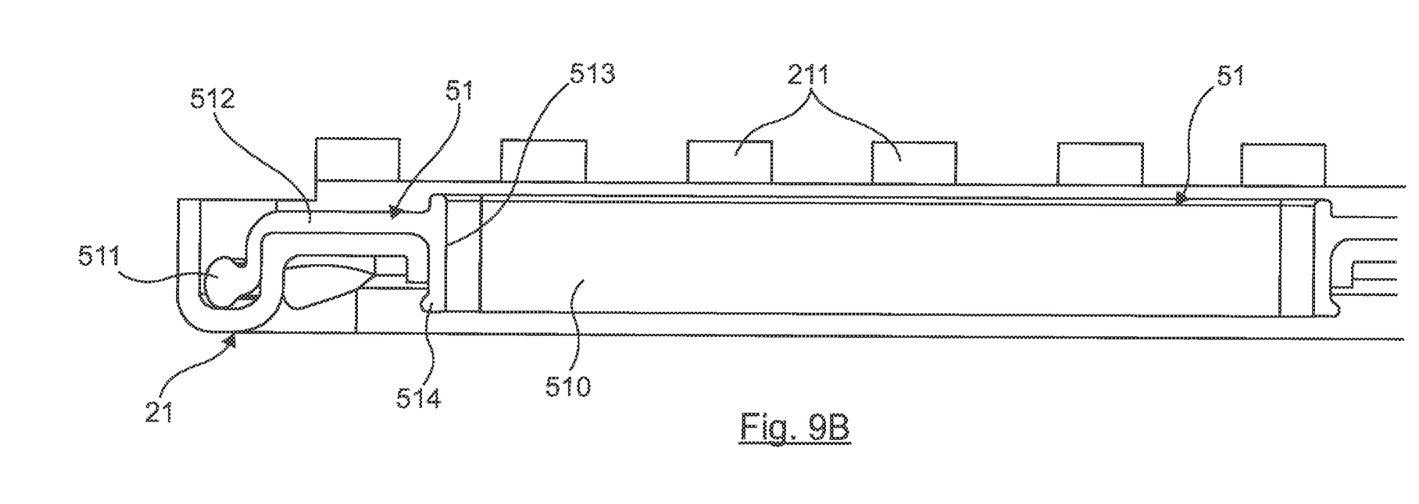
Figure 9C:
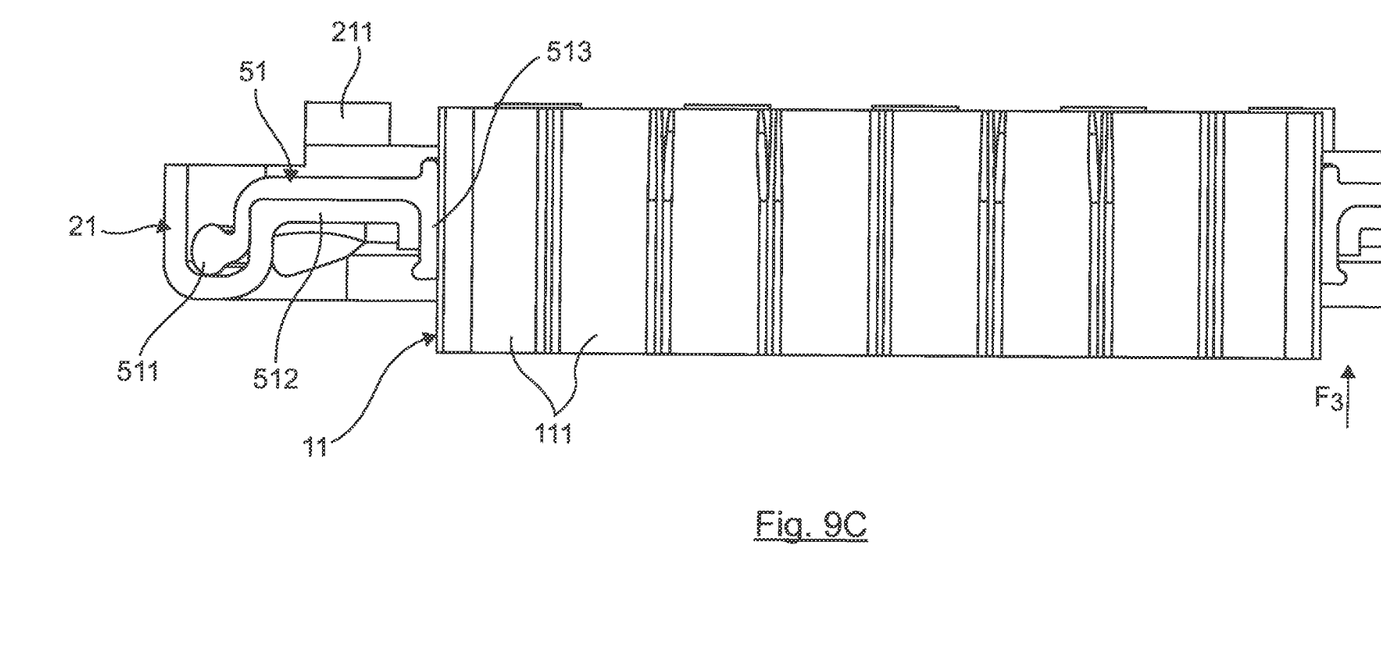
Figure 9D:
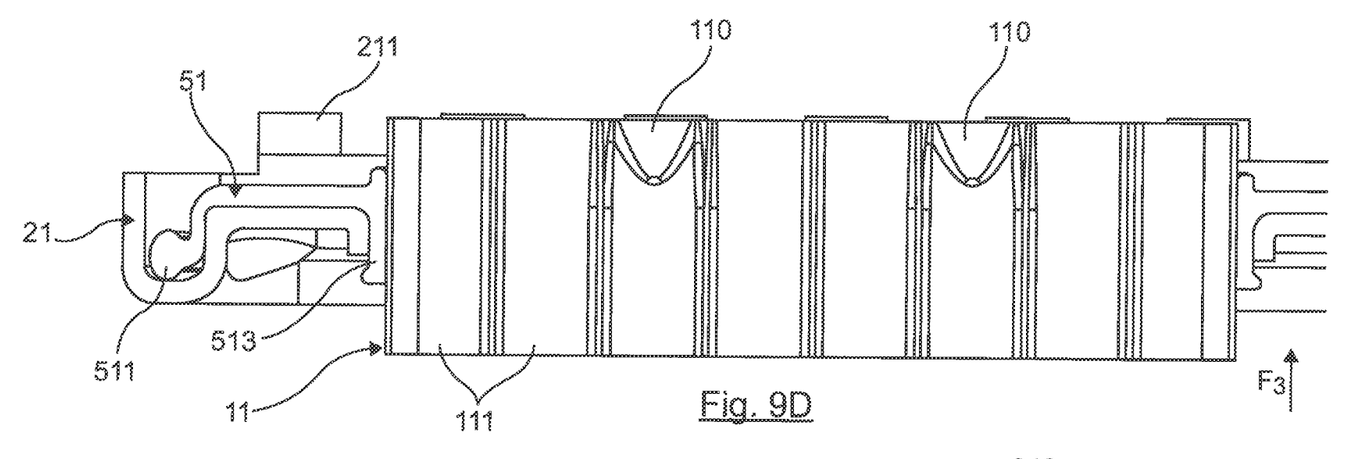

Here, these tubes 11 are formed from extruded aluminum and have a plurality of juxtaposed liquid circulation channels 111 (visible in FIGS. 9C and 9D). The channels 111 of a tube 11 are separated by reinforcing legs that provide mechanical strength to the tubes to resist pressure (i.e., by way of minimizing the deformation of the tubes 11 under pressure).

The operating pressure of the cooler of the invention is, for example, 1 bar, but may be less than or greater than that value.

In a variant embodiment, the multichannel tubes are electro-welded but in that case have no reinforcing leg between the channels.

The bundle of tubes 11 comprises a first end and a second end.

As shown in FIG. 1, the first end of the bundle of tubes 11 is intended to be assembled with a first collector 21 and the second end of the bundle of tubes 11 is intended to be assembled with a second collector 22.

The cooler 1 further comprises a cover 31, 32 associated with each of the first and second collectors 21, 22 to form a manifold 41, 42 intended to collect and to distribute the cooling liquid.

Each manifold 41, 42 therefore includes a metal plate, generally termed the "collector" 21, 22, joining the ends of the tubes 11 of the bundle. The plate is associated with an element in the form of a cover 31, 32 generally termed the "fluid box" and connected in fluid-tight manner to the collector 21, 22 by its peripheral rim.

The assembly constituted by the collector 21, 22 and the corresponding cover 31, 32 defines a volume into which the tubes 11 of the bundle open.

Each manifold 41, 42 is therefore in fluid communication with the tubes 11.

As will be appreciated hereinafter, the various elements (collector, boxes and tubes) of the cooler 1 are mechanically fastened together in a fluid-tight manner via interposition of a seal 51, which provides a seal: between each collector 21, 22 and the tubes 11; and also between each collector 21, 22 and its corresponding cover 31, 32.

Figure 2:
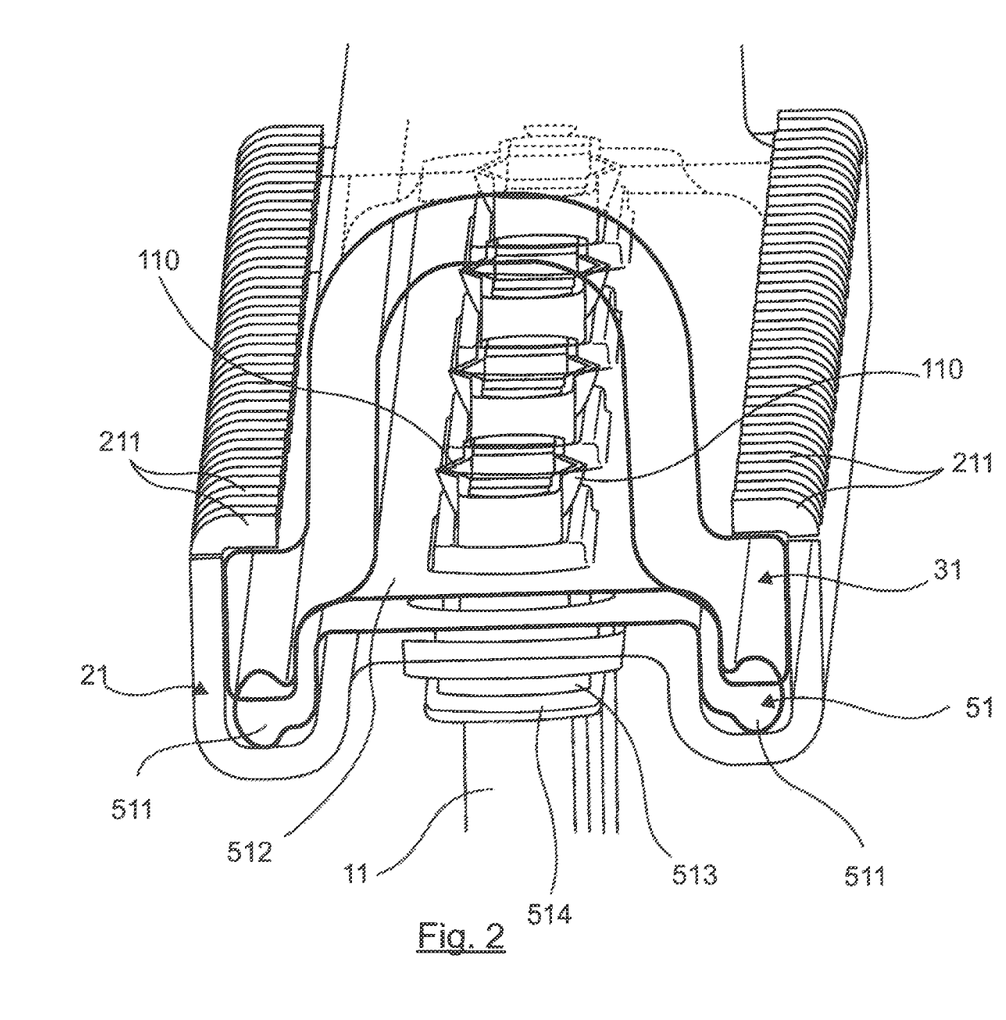
FIG. 2 is a sectional view of a cooler according to the invention at the level of a manifold.

As shown in the FIG. 2 sectional view, the tubes 11 open via the first collector 21.

Although this is not shown, the same applies to their opposite end via the second collector 22.

To this end, the collectors 21 comprise orifices 210 for introduction and passage of the tubes 21 (FIGS. 6A and 6B) that have a contour corresponding to that of a cross section of the tubes 11.

In other words, orifices 210 are oblong in this embodiment.

The cooler 1 further comprises a cooling fluid inlet and a cooling fluid outlet arranged on at least one manifold.

According to the embodiment shown, the fluid inlet 410 and the fluid outlet 411 are on the same manifold, here on the cover 31 of the first manifold 41.

The cooling liquid arrives and is evacuated at the level of the same first collector 21.

In this case a partition wall (not shown) is provided in the first manifold 41 enabling the fluid entering the cooler 1 to be separated from the fluid leaving the cooler 1.

Thus the cooling liquid, for example glycolated water, is introduced into the first manifold 41 via the fluid inlet 410 and is then distributed in some of the tubes 11 (termed "inlet tubes") via the first collector 21 of the first manifold 41.

The fluid circulates in the inlet tubes 11 and passes through the latter in a first direction. The fluid then passes into the second manifold 42 and circulates in the other direction in the other tubes 11 (termed "outlet tubes") to return to the first collector 21 and to be evacuated via the fluid outlet 411 of the first manifold 41.

The second manifold 42, termed the "turnaround manifold", is configured to distribute the liquid from the inlet tubes 11 to the outlet tubes 11. If necessary, one or more partition walls define the passage of the liquid in this second manifold 42.

The tubes 11 extend perpendicularly to the longitudinal axis of the collectors 21, 22 and the covers 31, 32.

The tubes 11 are intended to be in mechanical contact, or not, with at least one battery of the vehicle, and are advantageously made from a thermally conductive material (such as a metal, e.g., aluminum or aluminum alloy).

The cooler 1 is therefore positioned either: directly in contact with the battery or batteries on the bottom of the protective casing, and has a cooling liquid passed through it; or indirectly in contact with the battery or batteries, in the case of a cooler positioned outside the battery protection casing.

The longitudinal axis of the tubes 11 is parallel to the batteries to be cooled. In order to optimize the cooling of the batteries, one of the two plane surfaces of the oblong tubes 11 (FIG. 2) is in contact with the batteries, or at a distance from and facing the latter, so as to have a wide heat exchange surface.

The collectors 21, 22 and the covers 31, 32 are of substantially rectangular shape.

The collectors 21, 22 are formed from aluminum or steel. They comprise a plane collector plate 213 having a peripheral rim in which is formed a groove 212 adapted to receive the corresponding covers.

The groove 212 is preferably peripheral.

In other words, the groove 212 extends around the corresponding collector 21, 22 (FIGS. 6A and 6B).

The orifices 210, for the introduction and passage of the tubes 11, are formed at the level of a central zone of the collector plate 213.

The orifices 210 have an elongate shape in a direction substantially parallel to the longitudinal axis of the collector 21, 22.

As can be seen in the sectional view of FIG. 9A, these orifices 210 are each delimited by a curved edge forming a flange 217.

The height of the flange 217 may be constant or may vary along its periphery. For example, its height at the ends may be less than its height throughout the length of the orifice 210.

In the same figure, note that the groove 212 comprises: a lateral face 214, which is oriented substantially parallel to the tubes 11; a bottom 215, which is connected to the lateral face 214 and oriented substantially perpendicularly to the latter; and an external face 216, oriented substantially parallel to the lateral face 214.

Figure 7:
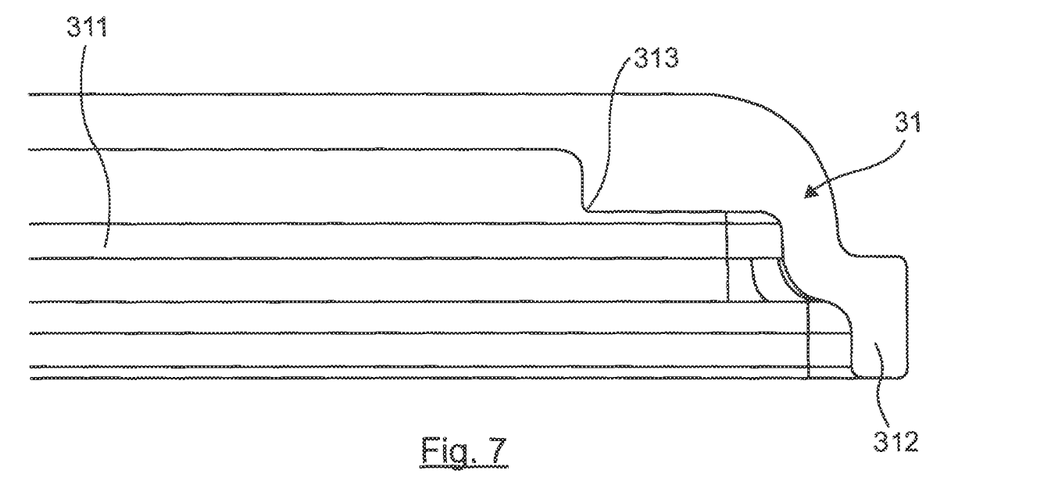
FIG. 7 is a part-sectional view of a cover of a manifold employed in a cooler according to the invention.
Figure 8A:
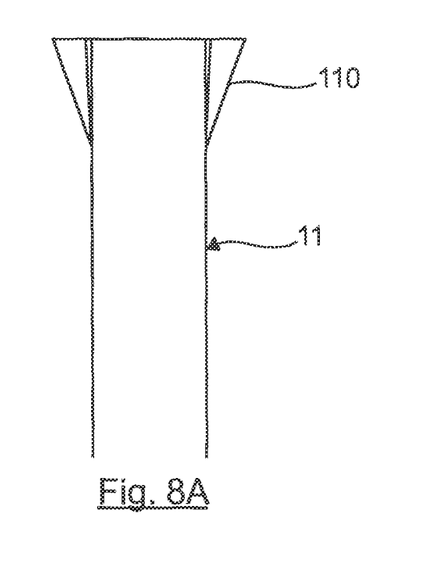
FIGS. 8A and 8B are respectively an external view and a view in longitudinal section of a flared end of a tube employed in a cooler according to the invention.
Figure 8B:
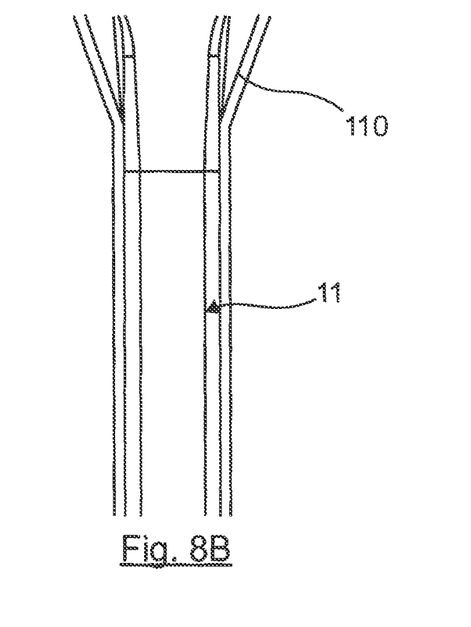

As shown in FIG. 7, the cover 31 is domed and, when seen in cross section, has the general shape of a U.

The cover 31 therefore features an internal cavity 311 adapted to allow the circulation of the cooling fluid and a widened free edge situated at the periphery of the internal cavity 311, forming a foot 312 of the cover.

The cover 32 is of identical shape.

Figure 5A:
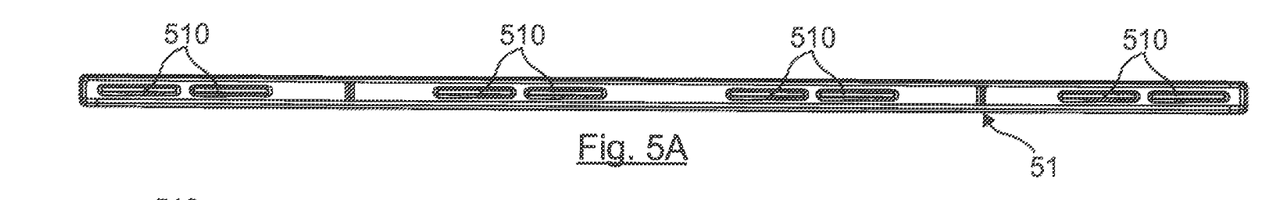
FIG. 5A is a top view of a seal used in a cooler according to the invention.
Figures 5B, 6A:
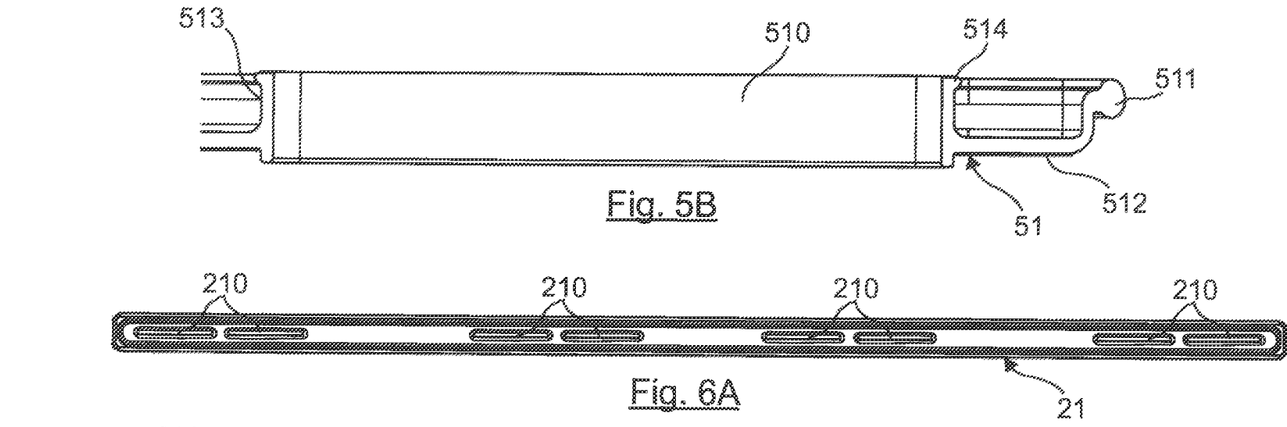
FIG. 5B is a part-sectional view of the seal from FIG. 5A.
FIG. 6A is a top view of a collector plate employed in a cooler according to the invention.
Figure 6B:
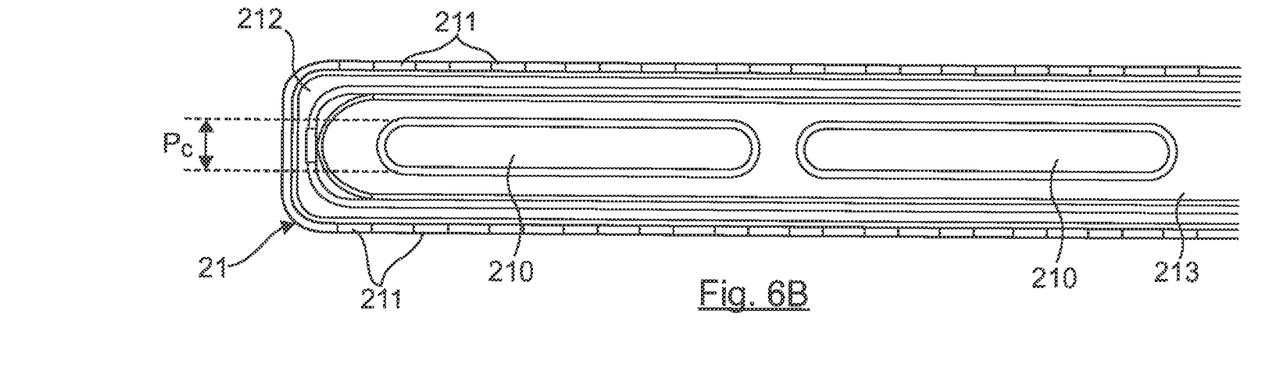
FIG. 6B is a detail view of the collector plate from FIG. 6A.

As shown in FIGS. 5A and 5B, the seal 51 takes the form of a blanket 512 of substantially rectangular shape that comprises a peripheral sealing bead 511.

The seal 51 features a plurality of oblong holes 510 that are formed at the level of a central zone of the blanket 512 for the passage of the tubes 11.

These holes 510 have an elongate shape in a direction substantially parallel to the longitudinal axis of the seal 51.

The holes 510 extend into flanges, which hereinafter are termed "nipples" 513 and are for retaining the corresponding collector.

These nipples 513 extend perpendicularly to the blanket 512. The holes 510 and the nipples 513 have a shape complementary to the shape of the tubes 11 that are intended to pass through them.

The seal 51 is advantageously made of an elastomer material. It may therefore be made of EPDM (ethylene-propylene-diene monomer).

The collectors 21, 22 each receive a compressible seal 51 at the level of the orifices 210 for the introduction and the passage of the tubes 11.

To this end, the nipple 513 of the seal 51 is forced through the flange 217 during assembly.

Moreover, the groove 212 of the collector 21, 22 is configured to accept the peripheral sealing bead 511 of the seal 51.

In a state with the tubes 11 assembled onto the manifolds 41, 42, the seal 51 is compressed in the space between the exterior wall of a tube 11 and the flange 217 of an orifice 210 of the collector 21.

The radial compression of the nipple 513 of the seal 51 in the flange 217 is preferably between 5 and 60% inclusive, for example between 15 and 40% inclusive, and in particular between 25 and 30% inclusive.

This ratio is equal to the difference between the thickness of the wall of the nipple 513 before assembly and the thickness after assembly, divided by the thickness of the wall of the nipple 513 before assembly.

The seal 51 therefore seals the connection between each of the tubes 11 and the collector 21 to prevent leaks of fluid.

Moreover, the peripheral sealing bead 511 of the seal 51 is intended to be arranged between the foot 312 of the cover 31 and the collector 21 so as to provide the seal between the cover 31 and the collector 21.

The groove 212 of the collector 21, 22 is therefore configured to receive the bead 511, so that the latter is sandwiched and compressed between the bottom of the groove 212 and the foot 312 of the cover 31.

The collectors 21, 22 are moreover configured to allow crimping of the foot 312 of the cover 31 in the groove 212.

To this end, the external face 216 of the groove 212 comprises, on two opposite edges of the collector 21, a series of lugs, teeth or tongues 211 spaced regularly and intended to be bent, as shown in FIG. 2, over an upper face of the foot 312 of the cover 31.

Each collector 21, 22 therefore retains the corresponding cover 31, 32 in position on the seal 51 and the collector 21, 22 after crimping the teeth 211 of the collector 21, 22 onto the corresponding cover 31, 32.

This also compresses the seal 51 to guarantee the sealing of the manifold 41, 42 at the level of the cover/collector connection.

This kind of mechanical assembly of the cooler 1 is relatively easy and enables a good seal to be obtained inside the manifolds 41, 42 in which the fluid circulates.

It is thus not necessary to employ brazing to provide mechanical pressure resistance and fluid-tightness for the cooler of the invention, and the flatness of the plane surface of the tubes 11.

Consequently, the exchange of heat between the tubes of the cooler and the batteries, and thus the cooling of the batteries, are both optimized.

Figure 3:
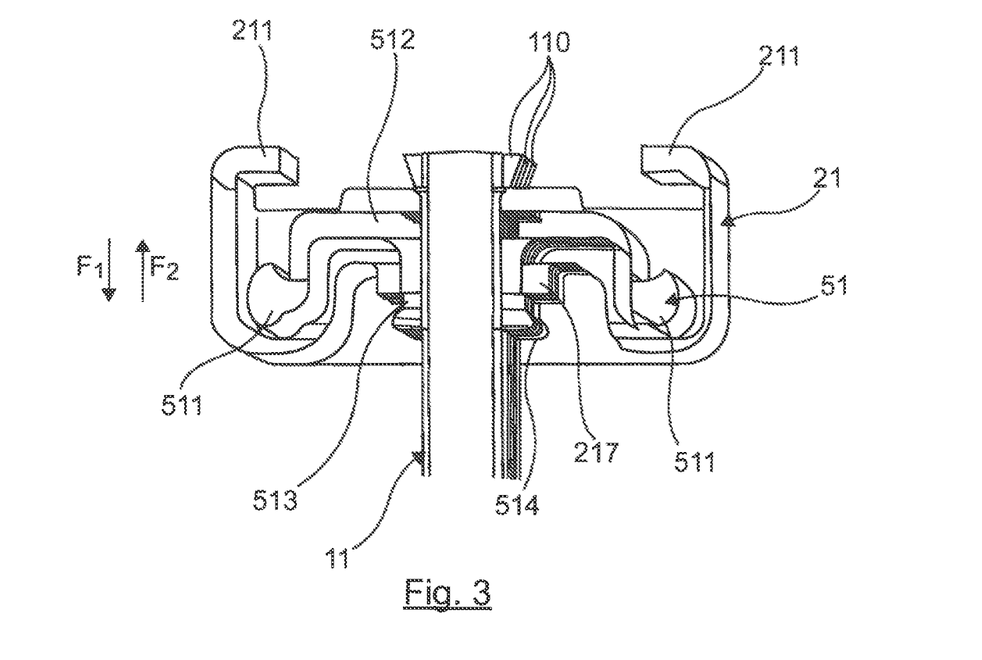
FIG. 3 is a part-sectional view, at the level of a manifold of a cooler according to the invention, showing the assembly of a tube onto the collector.

Each tube 11 is mounted prestressed on the seal 51 in the area of the flange 217 of the collector 21 (FIG. 3).

In other words, each tube 11 is a tight fit in the corresponding hole 510 of the seal 51.

It is therefore not necessary to provide a sealing flare of the tube 11 in this sealing zone.

To prevent pressurization of the cooling liquid causing sliding of the assembly constituted by the seal, the collector and the cover on the tubes, two solutions are described hereinafter.

A first solution involves providing: a flare for retaining the multi-channel tubes 11 in one direction relative to the collector (arrow $F_1$ in FIG. 3); and an abutment for retaining the tubes 11 in the other direction relative to the collector (arrow $F_2$ in FIG. 3).

To produce the flare for retaining the tubes 11, the end of the tubes 11 is deformed after insertion of the tubes 11 into the seal/collector assembly.

In all the situations described hereinafter, the width of the flare of a tube 11 is greater than the width $P_c$ (shown in FIG. 6B) of the flange 217 of the collector 21.

Figure 10A:
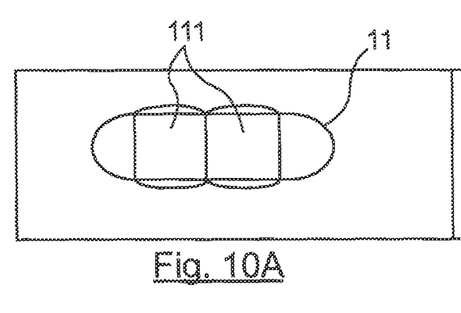
FIGS. 10A to 10H show diagrammatically different types of flare for retaining a tube on the collector of a cooler according to the invention.
Figure 10B:
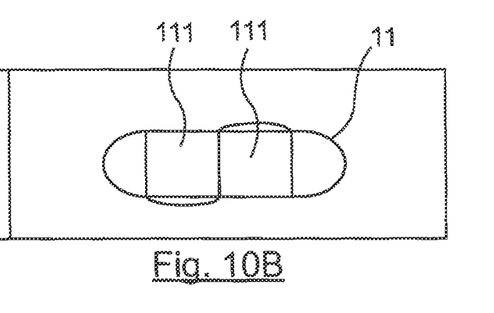

One or more walls of the channels 111 may be deformed. These deformed walls may be either face-to-face (i.e., "in phase" as shown in FIG. 10A) or face in opposite directions (i.e., "in phase opposition" as shown in FIG. 10B).

Figure 10C:
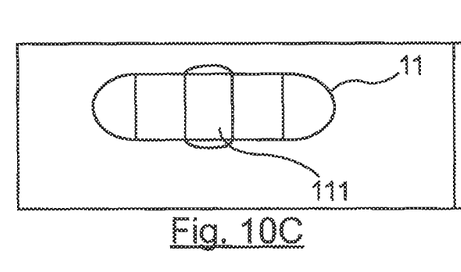
Figure 10D:
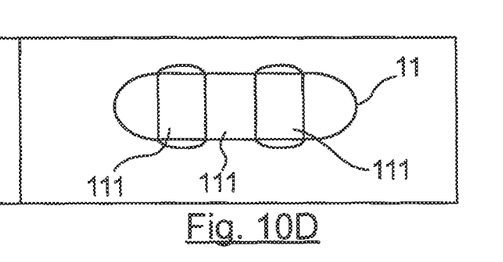

A channel 111 (FIG. 10C) or channels 111 (FIG. 10D) of a tube 11 may be deformed.

Of the "n" channels, "m" channels are preferably deformed to provide the pressure resistance and resistance to manipulation, with $\frac{1}{8} \leq m/n \leq 1$.

The two end channels 111 of a tube 11 may be deformed, or not.

Figure 10E:
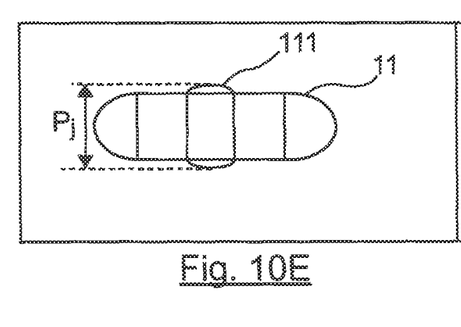
Figure 10F:
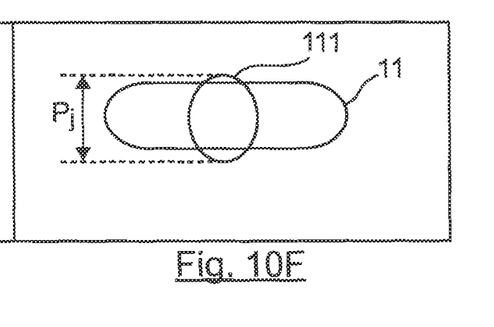

The legs of the tubes may be straight (FIG. 10E) or deformed (FIG. 10F). In both these cases, the width $P_j$ of the flare is greater than the width $P_c$ of the flange 217 of the collector 21.

Figure 10G:
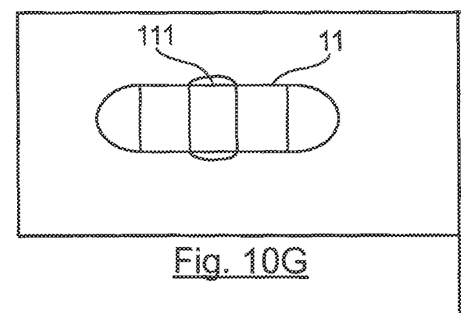
Figure 10H:
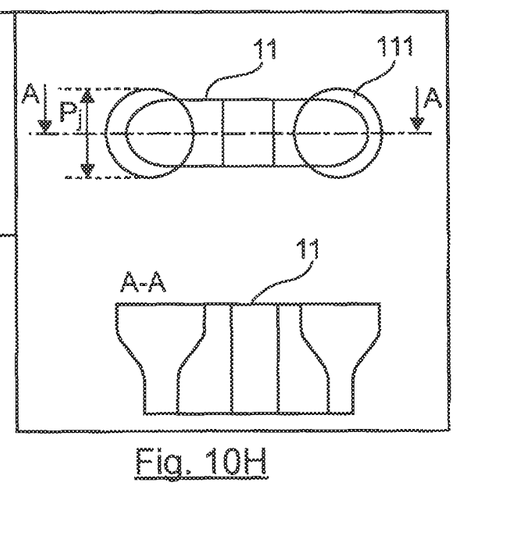

The circular arcs of the oblong section of the tube 11 are either deformed (FIG. 10H) or not (FIG. 10G). As the FIG. 10H sectional view taken along the line A-A shows, it is the semi-circular end of the oblong section that is deformed over a predetermined height.

Note that the reinforcing legs are therefore not deformed laterally in the configurations of FIGS. 10A to 10E and 10G, and are stretched without tearing.

In other words, the width of the flare is sufficiently small to avoid rupture of the reinforcing legs.

These various configurations may be combined with one another.

The end flare has a height between 1 and 10 mm inclusive in the longitudinal direction of the tube 11.

Note that in the FIG. 2 embodiment the central channel 111 of the multi-channel tubes 11 is flared on its opposite edges, the flares being indicated at 110.

Flares 110 formed at the end of tubes 11 are also visible in FIGS. 8A, 8B, 9D and 9E.

Note that each tube 11 comprises merely a single end flare 110 (in the longitudinal direction of the tube), and that the width of the retaining flare 110 is such that the width $P_j$ of the tube 11 at the level of the flare 110 is greater than the width $P_c$ of the flange 217 of the collector 21.

Note, moreover, that the flare 110 does not participate in the compression of the seal.

The cooler 1 moreover comprises one or more abutments for retaining the tubes 11 to retain the latter in the other direction relative to each of the collectors 21, 22.

In other words, these abutments prevent the tubes 11 from rising in the direction indicated by the arrow $F_2$ in FIG. 3 and from entering the manifolds 41, 42, which makes it possible to maintain the distance between the collectors 21, 22.

Figure 4:
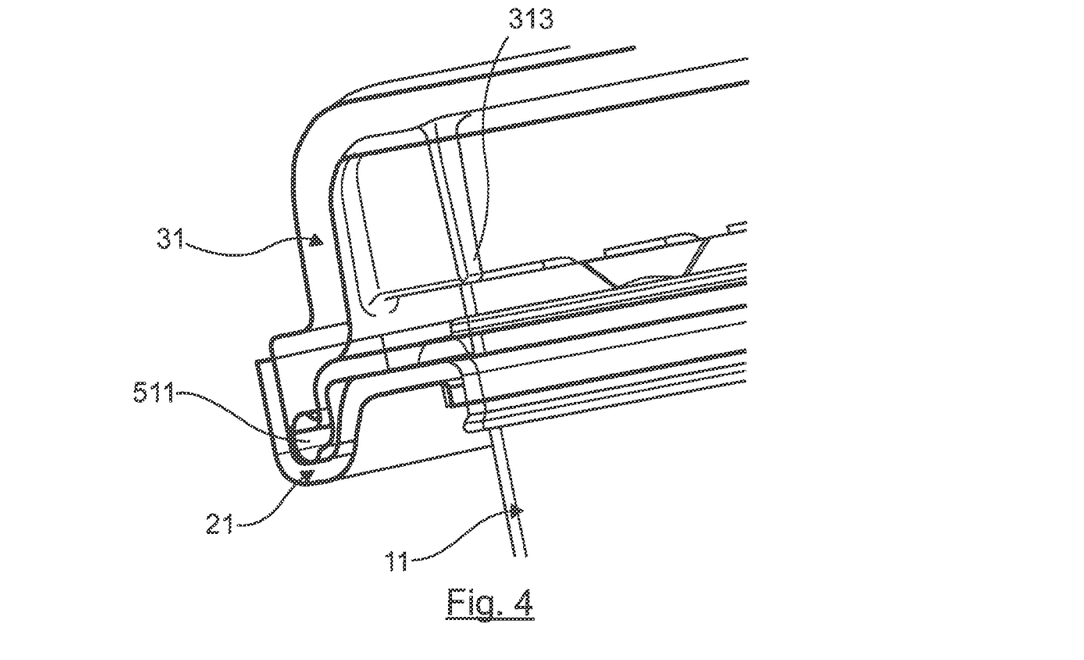
FIG. 4 is a partial detail view of a manifold and a duct showing the use of an abutment on the cover of the manifold to retain the duct in one direction relative to the collector of the manifold.

In the embodiment shown in FIGS. 4, 7 and 9D, two abutments 313 taking the form of a rib are produced on the interior wall of the cover 313.

These two abutments 313 are each intended to come into contact with one end of a tube 11 of the bundle of tubes 11 of the cooler 1.

The flares 110 for retaining the tubes 11 and the abutments 313 therefore enable the relative position of the cover/collector/seal assembly to be fixed. Consequently, this manifold/collector/seal assembly is prevented from sliding along the smooth tubes 11 in response to the pressurization of the cooling liquid; these elements therefore provide the mechanical pressure resistance of the cooler 1) cooler 1.

A second solution involves providing a flare for retaining the tubes in accordance with one of the approaches described above, and also providing flanges disposed on either side of each cover/collector assembly.

These flanges are crimped to the manifolds and/or the collectors and make it possible to maintain the distance between the first and second collectors 21, 22.

Figure 11:
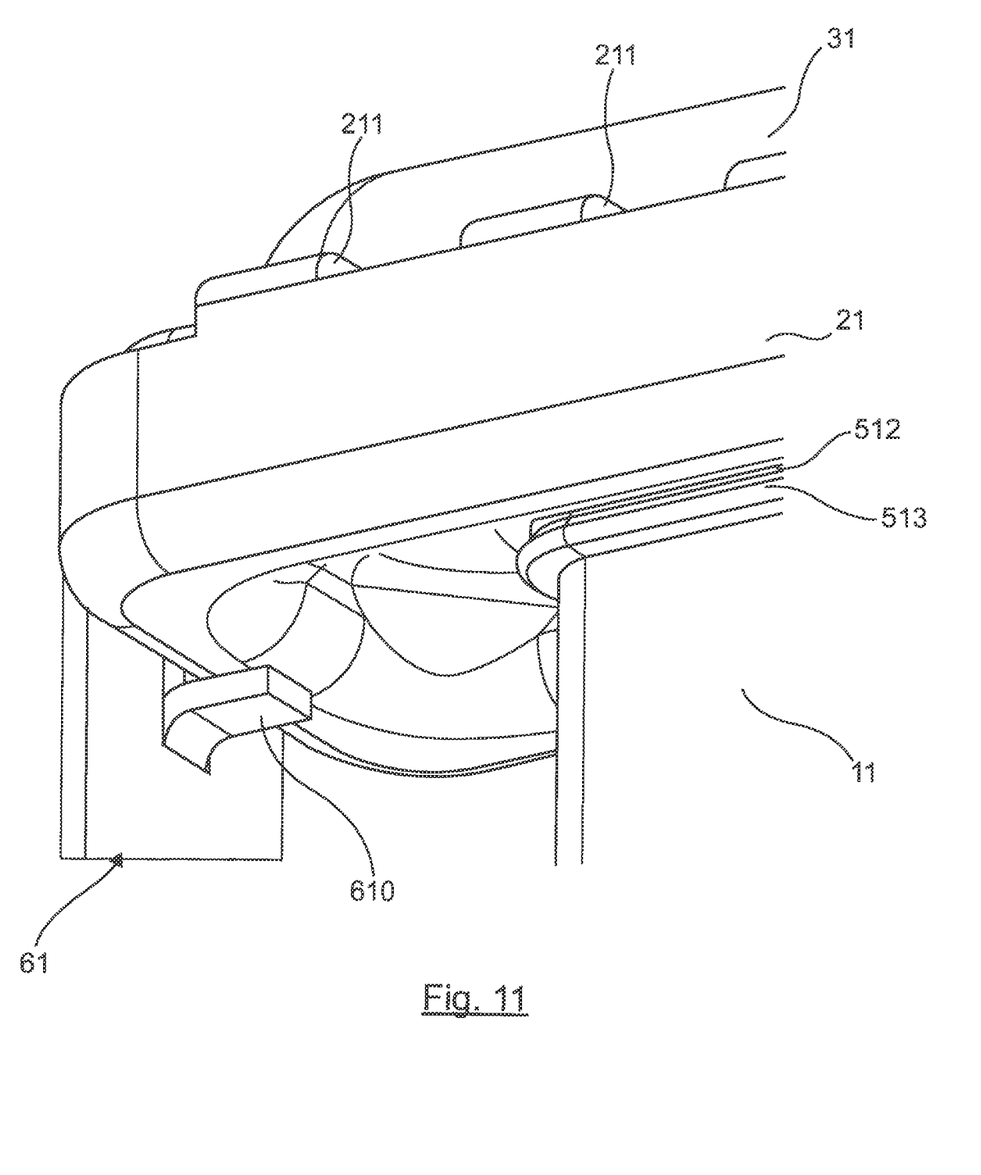
FIG. 11 is a detail view of a flange for maintaining the distance between the two collectors of a cooler according to the invention.

FIG. 11 shows part of one of the flanges 61 which features a curved lip 610 for retaining the collector 21 on which the cover 31 is mounted.

The flares 110 for retaining the tubes 11 and the flanges 61 therefore make it possible to fix the relative position of the cover/collector/seal assembly, to prevent the manifold/collector/seal assembly from sliding along the smooth tubes 11.

Method of Producing the Cooler

A method of producing a cooler according to the invention is described next with reference to FIGS. 2 and 9A to 9E.

During a first step S1, the seal 51 is positioned on the collector 21, shown separately in FIG. 9A, and pressed so as to introduce the nipples 513 of the seal 51 into the corresponding orifices 210 of the collector 21 (FIG. 9B).

The peripheral bead 511 of the seal 51 is moreover positioned in the peripheral groove 212 of the collector 21.

A lip 514 formed on each nipple 513 retains the seal 51 on the collector 21 and thus prevents the seal 51 from falling off the collector 21.

During a second step S2, the assembly comprising the collector 21 and the seal 51 is placed in a fitting head in which a punch compresses the seal 51 against the collector 21.

In a third step S3, the tubes 11 are inserted in the holes 510 of the nipples 513 in the direction indicated by an arrow $F_3$ in FIG. 9C.

The tubes 11 are fastened to the assembly comprising the collector 21 and the seal 51 by force-fitting them thereto. The ends of the tubes 11 are received in the collector plate 213 of the collector 21 and mechanically assembled to the latter by means of the compressible seal 51.

In a fourth step S4 (FIG. 9D), the end of the tubes 11 is flared by means of a punch of conical shape and in a symmetrical manner so as to form a relief for retaining each tube 11 in one direction relative to the collector 21.

Figure 9E:
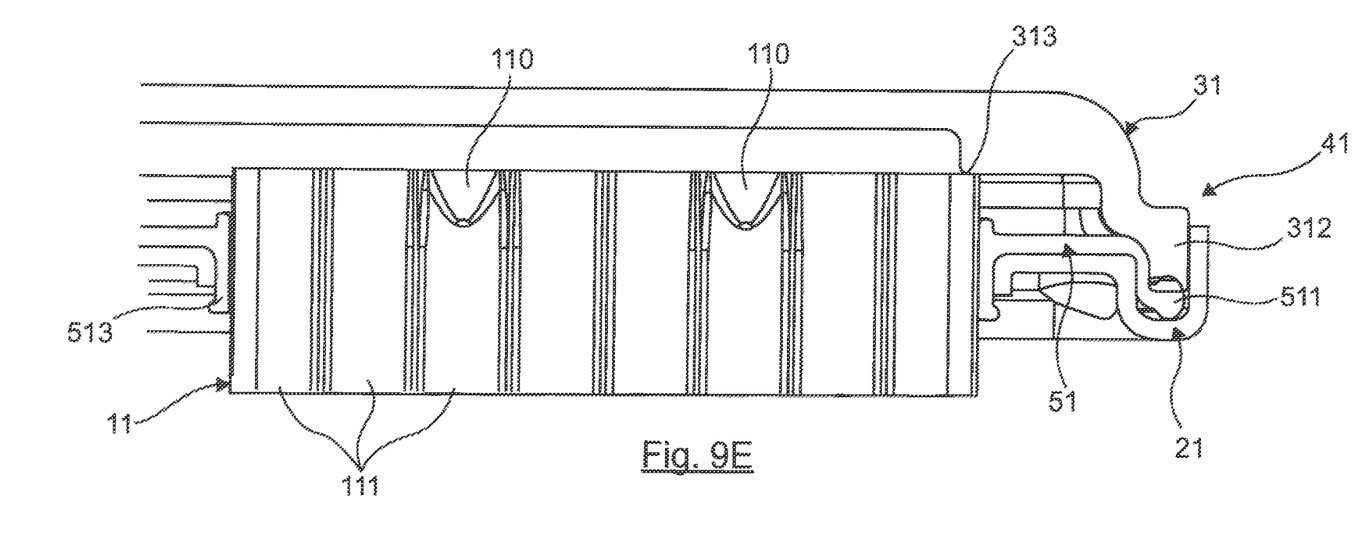

In the situation shown in FIGS. 9D and 9E, the ends of two channels 110 of the tube 11 are flared.

In a fifth step S5, the cover 31 is assembled to the collector 21, by crimping it on, to form a manifold 41 (FIG. 9E).

To this end, the foot 312 of the cover 31 is inserted in the groove 212 of the collector 21 in contact with the peripheral bead 511 of the seal 51, after which the lugs 211 of the collector 21 are bent over the edges of the cover 31 (FIG. 2).

The cover 31 is therefore received inside the collector 21 facing the collector plate 213, and covers the latter.

The same steps are employed to assemble the other end of the tubes 11 to the second manifold 42.

These steps are preferably executed simultaneously at both ends of the tubes 11.

Other Aspects and Variants

Apart from the fact that it makes it possible not to degrade the mechanical properties of the tubes and to improve the flatness of their tube surfaces in contact with the batteries (or facing the latter), the mechanical assembly of the cooler of the invention has other advantages compared to a conventional cooler assembled by brazing.

The approach of the invention therefore makes it possible to avoid internal pollution by residual brazing flux that reacts with the cooling liquid to degrade its anticorrosion and antifreeze properties, which can lead to a loss of thermal performance of the cooler by blocking of the channels of the tubes.

Mechanical assembly moreover enables the use of covers of complex shape produced by molding plastic which enables easy connection of the cover to the cooling loop and its fixing (in contrast to brazed coolers that necessitate the addition of metal tubes and fixing lugs to the extruded, pressed or rolled aluminum covers).

The covers, or water boxes, may be made of aluminum (of type 3003, for example) or plastic (of type PA66GF30, for example). Aluminum makes it possible to design parts with small thickness.

Plastic material makes it possible to produce complex shapes easily, thereby facilitating the fixing of the cooler to a battery casing and the connection of tubes.

The covers comprise tubes and internal partition walls, enabling an adequate circuit to be defined to ensure a homogeneous temperature between the tubes and balanced cooling of the batteries.

These covers further comprise fixing elements, such as centering pins, screwholes, clips, etc. for fixing the cooler to the battery casings.

They moreover carry at least two internal ribs (abutments) disposed face-to-face to prevent relative inward movement of the tubes into the casings by forces arising during manipulations.

Mechanical assembly moreover makes it possible to reduce the thickness of the material of the tubes and to reduce the number of partition walls in the tube channels.

Because a brazing furnace is not necessary for its assembly, the size of the cooler of the invention is not limited, and the placing of the outlet connectors is facilitated.

Note that the cooler of the invention may be used to heat or to cool one or more batteries according to circumstances and requirements, so as to regulate their temperature.

A heat transfer fluid flowing through the cooler can in this case absorb heat emitted by the battery or batteries in order to cool them or, depending on requirements, to feed them with heat if the temperature of the battery or batteries is insufficient for it or them to operate correctly.

The tubes, which are preferably in extruded aluminum, may be cut to the required length.

It is therefore possible to design a range of coolers adapted to different battery sizes.

The tubes can have other cross section shapes, such as a circular or oval shape, for example.

The liquid inlet and outlet tubes may be disposed on the same manifold (as in the embodiment described above) or on each of the two manifolds.

Internal partition walls of the manifolds define the type of cooling liquid circuit.

The invention claimed is:

1. A cooler for at least one electrical energy storage element, the cooler comprising:
   at least two manifolds,
   at least one duct for heat-transfer liquid circulation, the at least one duct having ends which each penetrate into a corresponding one of said manifolds,
   each of said manifolds comprising a collector having at least one opening for introduction and passage of said at least one duct, and a cover covering said collector in such a way as to define a volume, into which said at least one duct opens, for circulation of a heat-transfer liquid, and
   each of said manifolds comprising at least one seal,
   wherein said at least one duct and said cover are mechanically fastened together in a fluid-tight manner with said collector via interposition of said at least one seal:
     between said collector and said at least one duct; and
     also between said collector and said cover;
   wherein said at least one seal, for at least one of said manifolds, comprises a seal which is compressed both:
     between said collector and said at least one duct; and
     also between said collector and said cover;

the collector including a groove;

the cover including a foot disposed in the groove of the collector; and the collector further including teeth which crimp the foot of the cover between the teeth and the seal, to retain the cover in position on the seal.

2. The cooler as claimed in claim 1, wherein said at least one duct is a tight fit in a through-hole of said seal through which it passes, so that the seal is compressed between an interior wall of said at least one opening of the collector and an exterior wall of said at least one duct.

3. The cooler as claimed in claim 2, wherein the through-hole extends in a nipple of the seal disposed in the at least one opening of said collector.

4. The cooler as claimed in claim 3, wherein the nipple has on its exterior surface a peripheral lip to retain the seal on the collector.

5. The cooler as claimed in claim 1, wherein a lateral edge of the seal is sandwiched between a peripheral groove formed in the collector and the cover.

6. The cooler as claimed in claim 1, wherein said at least one duct comprises a plurality of heat-transfer liquid circulation channels.

7. The cooler as claimed in claim 6, further comprising an end flare forming a retaining relief in one direction of said at least one duct relative to the collector.

8. The cooler as claimed in claim 7, wherein said at least one end flare comprises a single end flare disposed at one of the ends of each of said at least one duct.

9. The cooler as claimed in claim 7, wherein the end flare has a height between 1 and 10 mm inclusive in a longitudinal direction of said at least one duct.

10. The cooler as claimed in claim 7, wherein the width of the end flare is greater than a width of said at least one opening of said collector.

11. The cooler as claimed in claim 7, wherein the end flare is produced inside one of the plurality of heat-transfer liquid circulation channels.

12. The cooler as claimed in claim 11, further comprising reinforcing legs which separate the channels and form lateral partition walls of the channels, wherein the end flare is produced without deforming the reinforcing legs.

13. The cooler as claimed in claim 7, further comprising at least one duct abutment to retain said at least one duct in the other direction relative to the collector.

14. The cooler as claimed in claim 13, wherein said at least one duct abutment is fastened to said cover.

15. The cooler as claimed in claim 1, wherein:

the at least one duct has an essentially oblong-shaped cross section;

the essentially oblong-shaped cross section being defined by two opposing planar surfaces and two circular arcs each interconnecting the opposing planar surfaces;

one of the two planar surfaces being in contact with the at least one electrical energy storage element or at a distance from and facing the at least one electrical energy storage element.

16. The cooler as claimed in claim 1, wherein:

the volume comprises an internal cavity adapted to allow the circulation of the heat-transfer liquid; and the foot comprises a widened free edge of the cover situated at a periphery of the internal cavity.

17. The cooler as claimed in claim 16, wherein:

the foot of the cover includes an upper face; and the teeth crimp the foot of the cover via bending over the upper face of the foot of the cover.

18. The cooler as claimed in claim 17, wherein:

the foot of the cover has a generally rectilinear cross-section; and the upper face comprises an upper surface of the generally rectilinear cross-section.

19. The cooler as claimed in claim 18, wherein:

the at least one duct has an essentially oblong-shaped cross section;

the essentially oblong-shaped cross section being defined by two opposing planar surfaces and two circular arcs each interconnecting the opposing planar surfaces;

one of the two planar surfaces being in contact with the at least one electrical energy storage element or at a distance from and facing the at least one electrical energy storage element.

* * * * *